(12) United States Patent
Jones

(10) Patent No.: US 10,743,531 B2
(45) Date of Patent: Aug. 18, 2020

(54) WIRELESS RODENT TRAP SENSOR

(71) Applicant: Keven Walter Jones, Palm Bay, FL (US)

(72) Inventor: Keven Walter Jones, Palm Bay, FL (US)

(\*) Notice: Subject to any disclaimer, the term of this patent is extended or adjusted under 35 U.S.C. 154(b) by 379 days.

(21) Appl. No.: 15/932,157

(22) Filed: Feb. 14, 2018

(65) Prior Publication Data

US 2018/0317476 A1 Nov. 8, 2018

Related U.S. Application Data

(60) Provisional application No. 62/602,676, filed on May 3, 2017.

(51) Int. Cl.
| | | |
|---|---|---|
| *A01M 31/00* | (2006.01) | |
| *A01M 23/24* | (2006.01) | |
| *G01D 5/12* | (2006.01) | |
| G08B 25/10 | (2006.01) | |
| A01M 23/30 | (2006.01) | |
| G08B 21/18 | (2006.01) | |
| G08B 23/00 | (2006.01) | |

(52) U.S. Cl.
CPC ........ *A01M 31/002* (2013.01); *A01M 23/245* (2013.01); *G01D 5/12* (2013.01); *A01M 23/30* (2013.01); *G08B 21/18* (2013.01); *G08B 23/00* (2013.01); *G08B 25/10* (2013.01)

(58) Field of Classification Search
CPC .. A01M 23/245; A01M 23/30; A01M 31/002; G01D 5/12
See application file for complete search history.

(56) References Cited

U.S. PATENT DOCUMENTS

| | | | | |
|---|---|---|---|---|
| 4,145,834 A | * | 3/1979 | Quigley | A01M 23/12 43/73 |
| 4,517,557 A | * | 5/1985 | Agron | A01M 23/30 340/540 |
| 4,719,718 A | * | 1/1988 | Kon | A01M 23/30 43/81 |
| 5,154,017 A | * | 10/1992 | Disalvo | A01M 23/30 43/81 |
| 5,184,416 A | * | 2/1993 | Brewer | A01M 23/30 43/81 |
| 5,477,635 A | * | 12/1995 | Orsano | A01M 23/30 43/81 |
| 6,137,415 A | * | 10/2000 | Rast | A01M 23/245 340/384.1 |
| 8,026,822 B2 | * | 9/2011 | Borth | A01M 1/026 340/573.2 |
| 8,156,683 B2 | * | 4/2012 | Slotnick | A01M 31/002 43/81 |
| 8,291,637 B2 | * | 10/2012 | Patterson | A01M 31/002 43/81 |

(Continued)

*Primary Examiner* — Walter L Lindsay, Jr.
*Assistant Examiner* — Milton Gonzalez

(57) ABSTRACT

A single motion sensing assembly device will activate and transmit a signal when a rodent trap is triggered. The single sensor assembly provide a sensing rod attached to one side of a leaf of an open hinge and a magnet affixed to the same leaf on the opposite side. The magnet is positioned adjacent to a reed switch and transmitter which is attached to the opposite leaf of the open hinge. The sensing rod is moved up and down causing the reed switch to activate the transmitter.

7 Claims, 2 Drawing Sheets

(56) References Cited

U.S. PATENT DOCUMENTS

2004/0020100 A1* 2/2004 O'Brien ................ A01M 23/30
  43/1
2008/0204253 A1* 8/2008 Cottee ................... A01M 23/30
  340/573.2
2009/0151221 A1* 6/2009 Daley ................... A01M 23/245
  43/58

* cited by examiner

WIRELESS RODENT TRAP SENSOR

FIELD OF INVENTION

The invention relates to motion sensors. More particularly, the present invention relates to motion sensor which utilize the mechanical movement of a rod to trigger a transmitter.

BACKGROUND OF THE INVENTION

The invention relates to a wireless signaling apparatus for use in connection with a rodent trap. Rodent traps are typically designed with no method of monitoring other than periodical visual or smell checks. There have been rodent traps with signaling apparatus as part of the trap sounding an alarm whereby the user has to be within audible range of the sounding alarm. Further, the user is also left vulnerable to unsanitary conditions produced by the remains of dead rodents. Some rodent traps may have a built-in alarm which is disposed of with the trap, this is not cost affective. Other rodent trap detection apparatus attach to the rodent trap and can be detached when a rodent is caught utilizing a trigger switch which has to be manually reset after engagement. This may be cumbersome and still leave the user vulnerable to insanity condition.

The present invention is a reusable and economical way of monitoring a rodent trap which resets automatically after engagement of the rodent trap. The present invention is not attached to nor a part of the rodent trap minimizing the health hazard produced by contact with a deteriorating rodent and long standing odors. The present invention simplicity makes it excellent for household use. The present invention will allow professionals in the pest control industry to monitor multiple rodent traps minimizing the risk of entering hazardous conditions numerous times to check traps.

SUMMARY OF INVENTION

This invention is a signaling device for use with rodent traps having a movable bail. This invention consist of a means for detecting the movement of the bail and a means of transmitting a signal in response to that detection. A mechanical motion sensing rod is attached to a leaf of a hinge. On the opposite side of the same leaf is a magnet. The sensing rod is placed over the bail. When the bail is engaged the rod is thrown upward with such force that it rebounds and resets itself. During the upward movement of the sensing rod by the bail, the magnet is also moved from it's monitoring position, causing the contacts on a stationary reed switch to change from an open state to a close state. The closing of the reed switch triggers the wireless transmission of a signal in response to the engagement of the bail.

DETAILED DESCRIPTION OF INVENTION

Figure 1:
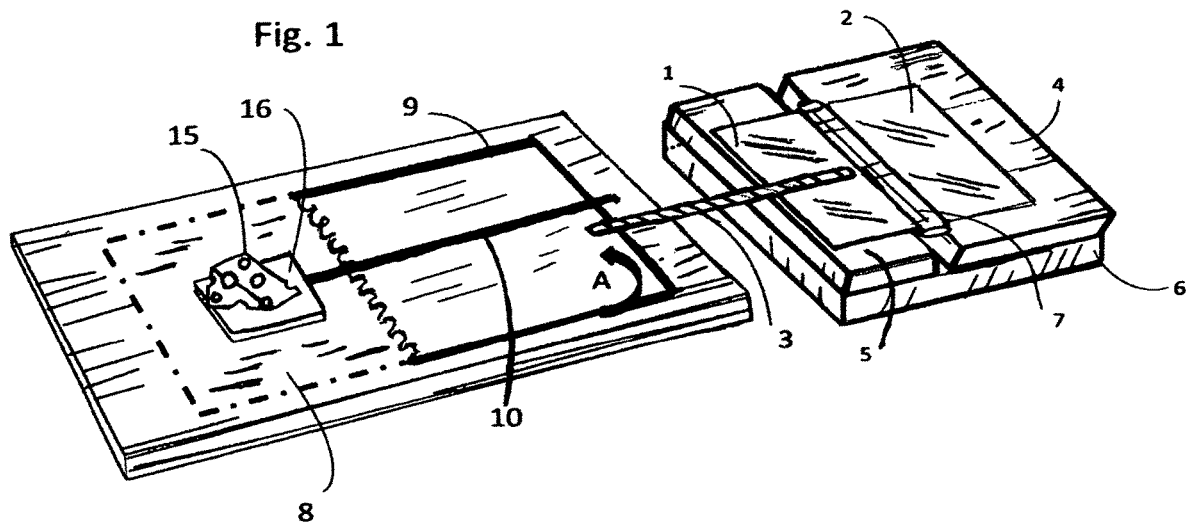
FIG. 1—A perspective view of the embodiment of the subject invention having a rodent trap placed in monitoring position.
Figure 2:
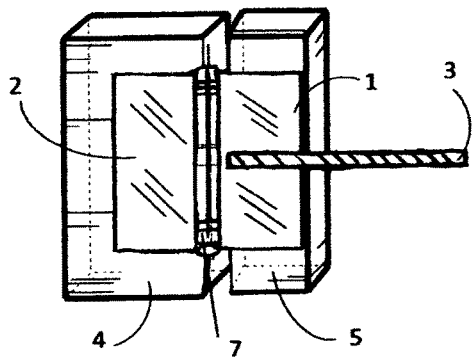
FIG. 2—A top side view of embodiment of subject invention without base weight.
Figure 3:
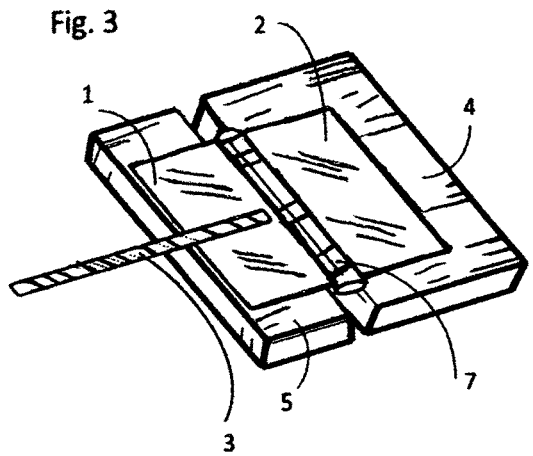
FIG. 3—A top down view of embodiment of invention without base weight.

Referring to the Figures, wherein like numerals indicate like or corresponding parts throughout the several views, an exemplary rodent trap is shown as 8 for purposes of illustration and not to be in any way limiting. The rodent trap 8 used in FIG. 1, is but one example of a variety of rodent traps which can be used for purposes of illustration.

Figure 4A:
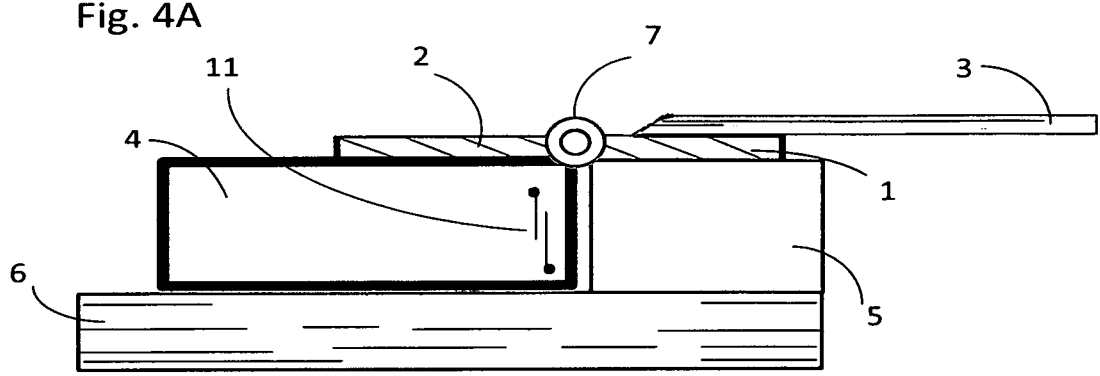
FIG. 4A—Side view of an embodiment of invention in the sensing position with reed switch contacts open and base weight attached.
Figure 4B:
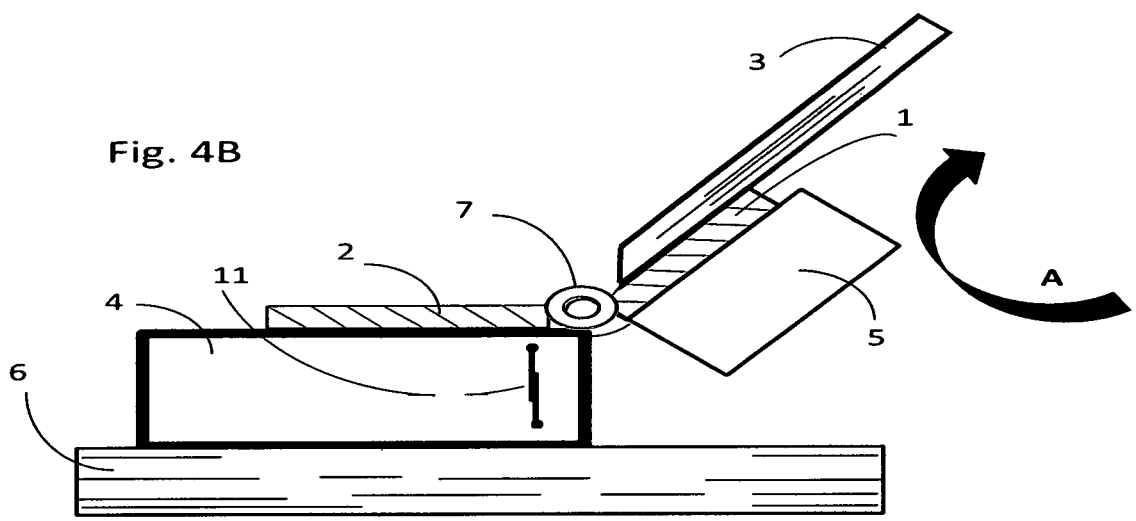
FIG. 4B—Side view of an embodiment of invention in the activated position with reed switch contacts closed and base weight attached.
Figure 5:
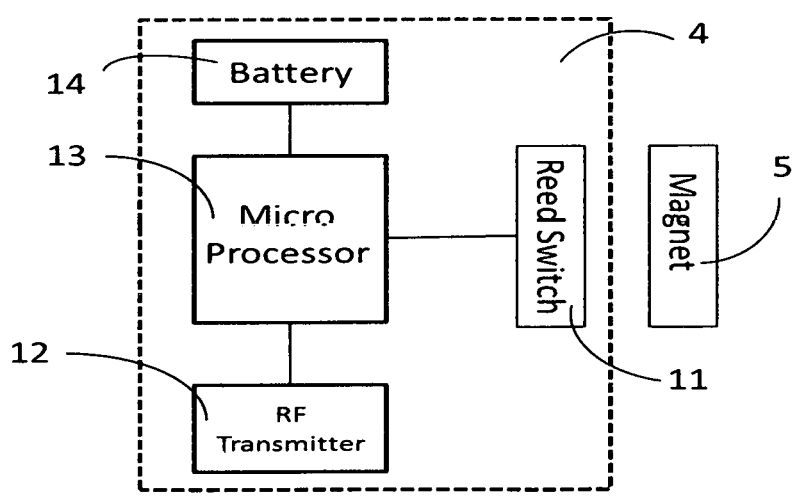
FIG. 5—Shows a block diagram of electronic components in sensor housing.

The subject invention will now be described with reference to the attached figures. FIG. 1 shows a perspective view of the subject device. The device is attached to a weighted base 6 which helps it maintain stability during engagement of the rodent trap. The device is positioned in front of a set non-engaged rodent trap 8 such that the sensing rod 3 hangs over the bail 9. Bail 9 is held in place by catch 10 which is releasable and held in place by bait tether 16. When the bait 15 is taken, bait tether 16 is altered releasing catch 10. When catch 10 is released, bail 9 moves in the direction indicated by the arrow A until it reaches the engaged position shown by the phantom in FIG. 1. The upward movement of bail 9 throws the mechanical sensing rod 3 upward. Although the sensing rod 3 is shown as an attachment to hinge leaf 1, it may also be made as a part of the hinge leaf 1 for durability. Hinge pin 7 connect leaf 1 to leaf 2 allowing leaf 1 to move independently. FIG. 4B shows the movement of sensing rod 3 causes magnet 5 to move away from sensor housing 4 where arrow A indicates engagement of the bail. FIG. 4A shows the device in the monitoring state, wherein reed switch 11 is sustained in the open position by magnet 5 being adjacent to it. When bail 9 is engaged, sensing rod 3 moves magnet 5 away from sensor housing 4 as demonstrated in FIG. 4B causing reed switch 11 to close which notifies microprocessor 13 powered by battery 14 to initiate wireless transmitter 12. The force of bail 9 engagement automatically reset sensing rod 3.

What is claimed is:

1. A sensor system for monitoring a Rodent Trap, said sensor system comprising:
    a hinge upon which a sensing rod is attached to a first leaf positioned above a magnet attached to an opposite side of said first leaf;
    a battery, a reed switch, a microprocessor, and a wireless transmitter, all contained within a sensor housing attached to a second leaf of said hinge adjacent to said magnet; and
    a base weight upon which rest said magnet and said housing.

2. The sensor as in claim 1, wherein one end of said sensing rod is attached to said first leaf of said hinge.

3. The sensor as in claim 2, wherein said end of said sensing rod is attached to the center of said first leaf perpendicular to a pin of said hinge.

4. The sensor as in claim 3, wherein the opposite end of said sensing rod extends inches over the edge of said first leaf.

5. The sensor as in claim 1, wherein said magnet is attached to said first leaf facing the pin of said hinge.

6. The sensor as in claim 1, wherein said housing is attached to said second leaf of said hinge with said reed switch facing the pin of said hinge.

7. The sensor as in claim 1, wherein said housing is attached to said base weight.

\* \* \* \* \*